US012451072B2

(12) United States Patent
Seo et al.

(10) Patent No.: US 12,451,072 B2
(45) Date of Patent: Oct. 21, 2025

(54) DISPLAY APPARATUS AND METHOD OF DRIVING THE DISPLAY APPARATUS

(71) Applicant: Samsung Display Co., LTD., Yongin-si (KR)

(72) Inventors: Wonjin Seo, Yongin-si (KR); Seung-Woon Shin, Yongin-si (KR); Hwaan Sung, Yongin-si (KR); Jeongah Lee, Yongin-si (KR); Daeho Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/903,981

(22) Filed: Oct. 1, 2024

(65) Prior Publication Data

US 2025/0118258 A1 Apr. 10, 2025

(30) Foreign Application Priority Data

Oct. 5, 2023 (KR) ........................ 10-2023-0132737

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0452* (2013.01); *G09G 2300/0842* (2013.01); *G09G 2320/0233* (2013.01); *G09G 2320/0247* (2013.01); *G09G 2330/027* (2013.01)

(58) Field of Classification Search
CPC ............... G09G 3/3233; G09G 3/2007; G09G 2300/0452; G09G 2300/0842; G09G 2320/0233; G09G 2320/0247; G09G 2330/027; G09G 3/3208; G09G 2300/0426; G09G 2320/043
See application file for complete search history.

(56) References Cited

U.S. PATENT DOCUMENTS

2023/0079091 A1* 3/2023 Yuan .................... G09G 3/3275 345/55

FOREIGN PATENT DOCUMENTS

KR 102004285 B1 7/2019
KR 102164157 B1 10/2020
(Continued)

*Primary Examiner* — Antonio Xavier
(74) *Attorney, Agent, or Firm* — CANTOR COLBURN LLP

(57) ABSTRACT

A display apparatus includes: a display panel including a plurality of pixels and a panel driver for applying a data voltage to pixels by the same pixel-column and performing a sensing operation, which senses the pixels receiving the data voltage. The plurality of pixels include first pixels having a first color and second pixels having a second color different from the first color. After the sensing operation is performed on a first odd-numbered group of the first pixels, the sensing operation is performed on a first even-numbered group of the first pixels. After the sensing operation is performed on the first even-numbered group of the first pixels, the sensing operation is performed on a second odd-numbered group of the second pixels. After the sensing operation is performed on the second odd-numbered group, the sensing operation is performed on a second even-numbered group of the second pixels.

17 Claims, 13 Drawing Sheets

(56) References Cited

FOREIGN PATENT DOCUMENTS

| | | | |
|---|---|---|---|
| KR | 1020210061557 | A | 5/2021 |
| KR | 102417423 | B1 | 7/2022 |

* cited by examiner

DISPLAY APPARATUS AND METHOD OF DRIVING THE DISPLAY APPARATUS

This application claims priority to Korean Patent Application No. 10-2023-0132737, filed on Oct. 5, 2023, and all the benefits accruing therefrom under 35 U.S.C. § 119, the content of which in its entirety is herein incorporated by reference.

BACKGROUND

1. Field

Embodiments of the present invention relate to a display apparatus. More particularly, embodiments of the present invention relate to a display apparatus performing a sensing operation and a method of driving the display apparatus.

2. Description of the Related Art

Generally, a display apparatus includes a display panel and a display panel driver. The display panel includes a plurality of gate lines, a plurality of data lines and a plurality of pixels. The display panel driver includes a gate driver providing a gate signal to the gate lines, a data driver providing a data voltage to the data lines and a driving controller controlling the gate driver and the data driver.

Generally, in a display apparatus, although pixels are manufactured by the same process, driving switching elements of the pixels may have different driving characteristics (e.g. mobilities and/or threshold voltages) and the pixels may emit the light with different luminance. Additionally, a driving time of the display apparatus accumulates, so that the pixels may be deteriorated and the driving characteristics of the driving switching elements may not uniform.

SUMMARY

Embodiments of the present invention provide a display apparatus for suppressing the occurrence of flicker and low-grayscale stains according to compensation data deviation by changing a sensing operation timing so that pixels of the same color are sensed while the temperature of the display panel is similar.

Embodiments of the present invention also provide a method of driving the display apparatus.

In an embodiment of a display apparatus according to the present invention, the display apparatus includes: a display panel and a panel driver. The display panel includes a plurality of pixels. The panel driver applies a data voltage to the plurality of pixels by a pixel-column group and performs a sensing operation, which is sensing the pixels receiving the data voltage. The plurality of pixels include first pixels having a first color and second pixels having a second color different from the first color. After the sensing operation is performed on a first odd-numbered group of the first pixels, the sensing operation is performed on a first even-numbered group of the first pixels. After the sensing operation is performed on the first even-numbered group of the first pixels, the sensing operation is performed on a second odd-numbered group of the second pixels. After the sensing operation is performed on the second odd-numbered group, the sensing operation is performed on a second even-numbered group of the second pixels.

In an embodiment of the present invention, the plurality of pixels may further include third pixels having a third color different from the first color and the second color. After the sensing operation is performed on the second even-numbered group, the sensing operation may be performed on a third odd-numbered group of the third pixels. After the sensing operation is performed on the third odd-numbered group, the sensing operation may be performed on a third even-numbered group of the third pixels.

In an embodiment of the present invention, the first color may be red, the second color may be green and the third color may be blue.

In an embodiment of the present invention, the first color may be blue, the second color may be red and the third color may be green.

In an embodiment of the present invention, the display panel may include first to sixth data lines outputting the data voltage. The data voltage may include first to sixth data voltages. The first odd-numbered group may be connected to the first line. The second odd-numbered group may be connected to the second line. The third odd-numbered group may be connected to the third line. The first even-numbered group may be connected to the fourth line. The second even-numbered group may be connected to the fifth line. The third even-numbered group may be connected to the sixth line. The panel driver may output the fourth data voltage to the fourth data line after outputting the first data voltage to the first data line. The panel driver may output the second data voltage to the second data line after outputting the fourth data voltage to the fourth data line. The panel driver may output the fifth data voltage to the fifth data line after outputting the second data voltage to the second data line. The panel driver may output the third data voltage to the third data line after outputting the fifth data voltage to the fifth data line. The panel driver may output the sixth data voltage to the sixth data line after outputting the third data voltage to the third data line.

In an embodiment of the present invention, the display panel may include first to sixth data lines outputting the data voltage. The data voltage may include first to sixth data voltages. The first odd-numbered group may be connected to the first line. The second odd-numbered group is connected to the second line. The third odd-numbered group is connected to the third line. The first even-numbered group is connected to the fourth line. The second even-numbered group is connected to the fifth line. The third even-numbered group is connected to the sixth line. The panel driver may output the sixth data voltage to the sixth data line after outputting the third data voltage to the third data line. The panel driver may output the first data voltage to the first data line after outputting the sixth data voltage to the sixth data line. The panel driver may output the fourth data voltage to the fourth data line after outputting the first data voltage to the first data line. The panel driver may output the second data voltage to the second data line after outputting the fourth data voltage to the fourth data line. The panel driver may output the fifth data voltage to the fifth data line after outputting the second data voltage to the second data line.

In an embodiment of the present invention, one of the plurality of pixels may include a first transistor including a control electrode connected to a first node, a first electrode configured to receive a first power voltage and a second electrode connected to a second node, a second transistor including a control electrode configured to receive a scan signal, a first electrode connected to a data line and a second electrode connected to the first node, a third transistor including a control electrode configured to receive a sensing gate signal, a first electrode connected to a sensing line and a second electrode connected to the second node, a storage capacitor including a first electrode connected to the first node and a second electrode connected to the second node and a light emitting element including a first electrode connected to the second node and a second electrode configured to receive a second power voltage.

In an embodiment of the present invention, the sensing operation may be performed in response to a power-off signal applied to the panel driver.

In an embodiment of a display apparatus according to the present invention, the display apparatus includes a display panel and a panel driver. The display panel includes a plurality of pixels. The panel driver applies a data voltage to the plurality of pixels by a pixel-column and performs a sensing operation, which is sensing the pixels receiving the data voltage. The plurality of pixels include first pixels having a first color, second pixels having a second color different from the first color and third pixels having a third color different from the first color and the second color. After the sensing operation is performed on a first 3P−2-numbered group of the first pixels, the sensing operation is performed on a first 3P−1-numbered group of the first pixels (herein, P is a positive integer). After the sensing operation is performed on the first 3P−1-numbered group, the sensing operation is performed on a first 3P-numbered group of the first pixels. After the sensing operation is performed on the first 3P-numbered group, the sensing operation is performed on a second 3P−2-numbered group of the second pixels. After the sensing operation is performed on the second 3P−2-numbered group, the sensing operation is performed on a second 3P−1-numbered group of the second pixels. After the sensing operation is performed on the second 3P−1-numbered group, the sensing operation is performed on a second 3P-numbered group of the second pixels. After the sensing operation is performed on the second 3P-numbered group, the sensing operation is performed on a third 3P−2-numbered group of the third pixels. After the sensing operation is performed on the third 3P−2-numbered group, the sensing operation is performed on a third 3P−1-numbered group of the third pixels. After the sensing operation is performed on the third 3P−1-numbered group, the sensing operation is performed on a third 3P-numbered group of the third pixels.

In an embodiment of the present invention, the first color may be red, the second color may be green and the third color may be blue.

In an embodiment of the present invention, the first color may be blue, the second color may be red and the third color may be green.

In an embodiment of the present invention, the display panel may include first to ninth data lines outputting the data voltage. The data voltage may include first to ninth data voltages. The first 3P−2-numbered group may be connected to the first data line. The second 3P−2-numbered group may be connected to the second data line. The third 3P−2-numbered group may be connected to the third data line. The first 3P−1-numbered group may be connected to the fourth data line. The second 3P−1-numbered group may be connected to the fifth data line. The third 3P−1-numbered group may be connected to the sixth data line. The first 3P-numbered group may be connected to the seventh data line. The second 3P-numbered group may be connected to the eighth data line. The third 3P-numbered group may be connected to the ninth data line. The panel driver may output the fourth data voltage to the fourth data line after outputting the first data voltage to the first data line. The panel driver may output the seventh data voltage to the seventh data line after outputting the fourth data voltage to the fourth data line. The panel driver may output the second data voltage to the second data line after outputting the seventh data voltage to the seventh data line. The panel driver may output the fifth data voltage to the fifth data line after outputting the second data voltage to the second data line. The panel driver may output the eighth data voltage to the eighth data line after outputting the fifth data voltage to the fifth data line. The panel driver may output the third data voltage to the third data line after outputting the eighth data voltage to the eighth data line. The panel driver may output the sixth data voltage to the sixth data line after outputting the third data voltage to the third data line. The panel driver may output the ninth data voltage to the ninth data line after outputting the sixth data voltage to the sixth data line.

In an embodiment of the present invention, the first color may be red, the second color may be green and the third color may be blue. The display panel may include first to ninth data lines outputting the data voltage. The data voltage may include first to ninth data voltages. The first 3P−2-numbered group may be connected to the first data line. The second 3P−2-numbered group may be connected to the second data line. The third 3P−2-numbered group may be connected to the third data line. The first 3P−1-numbered group may be connected to the fourth data line. The second 3P−1-numbered group may be connected to the fifth data line. The third 3P−1-numbered group may be connected to the sixth data line. The first 3P-numbered group may be connected to the seventh data line. The second 3P-numbered group may be connected to the eighth data line. The third 3P-numbered group may be connected to the ninth data line. The panel driver may output the sixth data voltage to the sixth data line after outputting the third data voltage to the third data line. The panel driver may output the ninth data voltage to the ninth data line after outputting the sixth data voltage to the sixth data line. The panel driver may output the first data voltage to the first data line after outputting the ninth data voltage to the ninth data line. The panel driver may output the fourth data voltage to the fourth data line after outputting the first data voltage to the first data line. The panel driver may output the seventh data voltage to the seventh data line after outputting the fourth data voltage to the fourth data line. The panel driver may output the second data voltage to the second data line after outputting the seventh data voltage to the seventh data line. The panel driver may output the fifth data voltage to the fifth data line after outputting the second data voltage to the second data line. The panel driver may output the eighth data voltage to the eighth data line after outputting the fifth data voltage to the fifth data line.

In an embodiment of the present invention, the sensing operation may be performed in response to a power-off signal applied to the panel driver.

In an embodiment of the present invention, one of the plurality of pixels may include a first transistor including a control electrode connected to a first node, a first electrode configured to receive a first power voltage and a second electrode connected to a second node, a second transistor including a control electrode configured to receive a scan signal, a first electrode connected to a data line and a second electrode connected to the first node, a third transistor including a control electrode configured to receive a sensing gate signal, a first electrode connected to a sensing line and a second electrode connected to the second node, a storage capacitor including a first electrode connected to the first node and a second electrode connected to the second node and a light emitting element including a first electrode connected to the second node and a second electrode configured to receive a second power voltage.

In an embodiment of a method of driving a display apparatus according to the present invention, the method includes sensing a first odd-numbered group of first pixels having a first color, after sensing the first odd-numbered group, sensing a first even-numbered group of the first pixels, after sensing the first even-numbered group, sensing a second odd-numbered group of second pixels having a second color different from the first color and after sensing the second odd-numbered group, sensing a second even-numbered group of the second pixels.

In an embodiment of the present invention, the method may further include after sensing the second even-numbered group, sensing a third odd-numbered group of third pixels having a third color different from the first color and the second color and after sensing the third odd-numbered group, sensing a third even-numbered group of the third pixels.

In an embodiment of the present invention, the first color may be red, the second color may be green and the third color may be blue.

In an embodiment of the present invention, the first color may be blue, the second color may be red and the third color may be green.

In an embodiment of the present invention, the method may further include receiving a power-off signal before sensing the first odd-numbered group.

According to the display apparatus described above and the method of driving a display apparatus, in the order in which the sensing operation is performed may be different from the conventional display apparatus, so that pixels having the same color may be sensed at the substantially same temperature. Accordingly, difference of the sensing data according to temperature difference between the pixels having the same color may be decreased. Additionally, the difference of the sensing data is decreased, so that difference of a compensation data (e.g. the data voltage considering conditions of the display panel, such as the threshold voltage of the driving transistor, the mobility of the driving transistor, the temperature, etc.) may be decreased. Additionally, the difference of the compensation data is decreased, the quality of display panel may be effectively improved.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, the present invention will be described in more detail with reference to the accompanying drawings.

Figure 1:
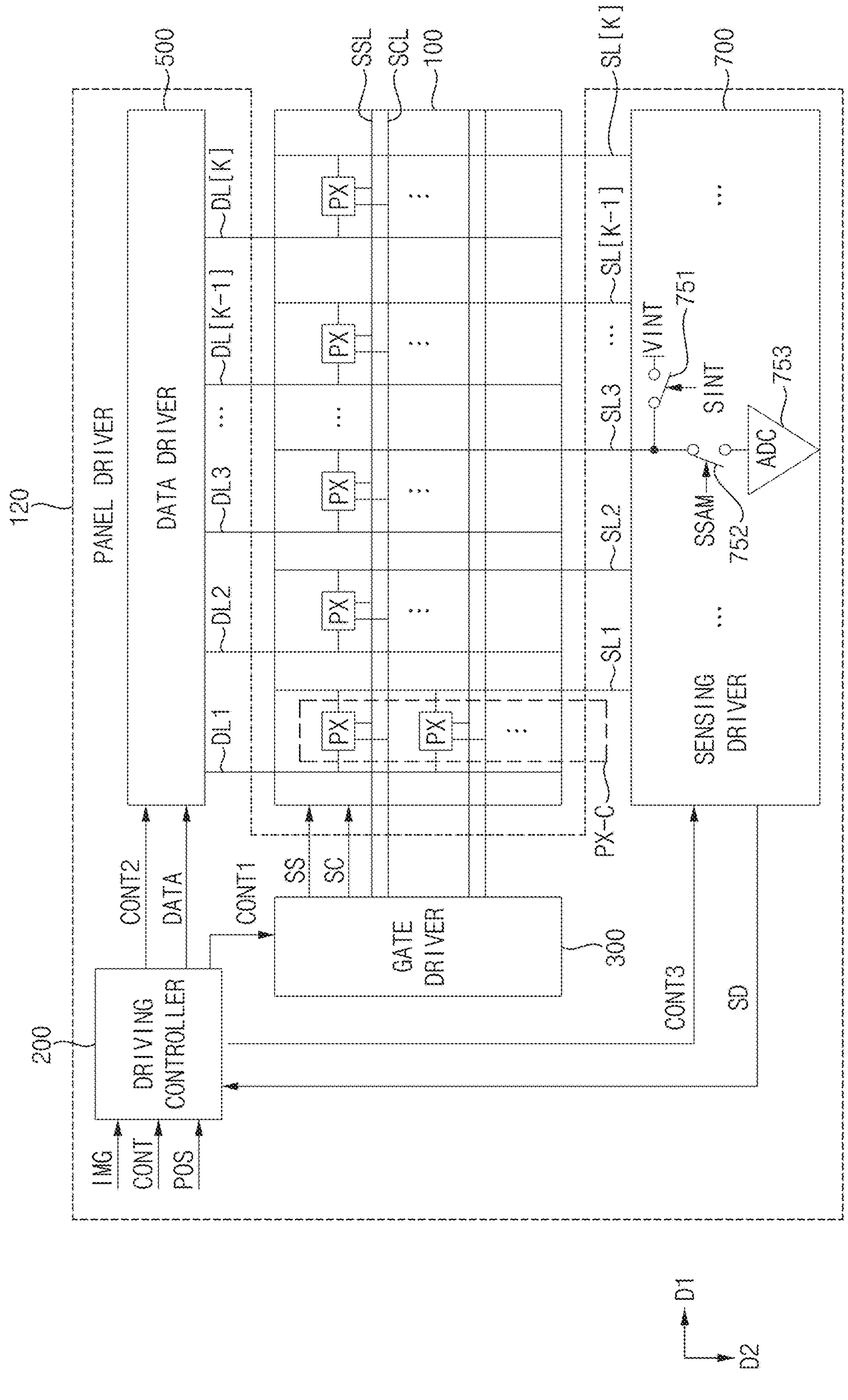
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus according to embodiments of the present invention may include a display panel 100 including a plurality of pixels PX and a panel driver 120 driving the display panel 100. In an embodiment, the panel driver 120 may include a gate driver 300 providing a scan signal SC and a sensing gate signal SS to the pixels PX, a data driver 500 connected to the pixels PX through data lines DL1, DL2, DL3 to DL[K−1] and DL[K] (herein, the K is a positive integer), a sensing driver 700 connected to the pixels PX through sensing lines SL1, SL2, SL3 to SL[K−1] and SL[K] (herein, the K is a positive integer) and a driving controller 200 controlling the gate driver 300, the data driver 500 and the sensing driver 700.

The display panel 100 may include the data lines DL1, DL2, DL3 to DL[K−1] and DL[K] and the pixels PX connected to the data lines DL1, DL2, DL3 to DL[K−1] and DL[K]. Additionally, the display panel 100 may further include a scan line SCL for providing the scan signal SC to the pixels PX and the sensing gate line SSL for providing the sensing gate signal SS to the pixels PX. For example, the display panel 100 may be an organic light emitting diode ("OLED") display panel or a quantum dot ("QD") display panel, but the present invention is not limited thereto.

A display apparatus may include the display panel 100, the driving controller 200, the gate driver 300 and the data driver 500. In an embodiment, the driving controller 200 and the data driver 500 may be formed integrally with each other.

The display panel 100 includes a display region configured to display an image and a peripheral region adjacent to the display region. In an embodiment, the gate driver 300 may be disposed in the peripheral region. In an embodiment, the gate driver 300 may be integrated in the peripheral region.

The display panel 100 may include the scan line SCL, the data lines DL1, DL2, DL3 to DL[K−1] and DL[K] and pixels PX electrically connected to the scan lines SCL and the data lines DL1, DL2, DL3 to DL[K−1] and DL[K]. The scan line SCL and the data lines DL1, DL2, DL3 to DL[K−1] and DL[K] may extend in a direction intersecting each other.

The driving controller 200 receives input image data IMG, an input control signal CONT and a power-off signal POS from a host processor (e.g. application processor) and/or graphic processing unit ("GPU"). For example, the input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT and may output the generated first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT and may output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 by receiving the power-off signal POS and the input control signal CONT. The driving controller 200 may output the third control signal CONT3 to the sensing driver 700.

The gate driver 300 may generate the scan signals SC for driving the scan lines SCL and the sensing gate signal SS for driving the sensing gate lines SSL in response to the first control signal CONT1 received from the driving controller 200. The gate driver 300 may output the scan signal to the scan line SCL and may output the sensing gate signal SS to the sensing gate line SSL.

The data driver 500 may receive the second control signal CONT2 and the data signal DATA from the driving controller 200. The data driver 500 may generate data voltages obtained by converting the data signal DATA into the data voltage having an analog type. The data driver 500 may output the data voltages to the data lines DL1, DL2, DL3 to DL[K−1] and DL[K].

In an embodiment, the data driver 500 may be implemented with one or more integrated circuits. In another embodiment, the data driver 500 and the driving controller 200 may be implemented as a single integrated circuit and the single integrated circuit may be called a timing controller embedded data driver ("TED").

The sensing driver 700 may receive the third control signal CONT3 from the driving controller 200. The sensing driver 700 may generate sensing data SD by sensing the pixels PX through the sensing lines SL1, SL2, SL3 to SL[K−1] and SL[K]. For example, the sensing driver 700 may sense a driving characteristic (e.g., a mobility and/or a threshold voltage) of the driving transistor by measuring a sensing current (or a sensing voltage) of the driving transistor of the pixels PX through the sensing line SL1, SL2, SL3 to SL[K−1] and SL[K]. For example, an operation sensing the driving characteristic (e.g., a mobility and/or a threshold voltage) of the driving transistor may be called a sensing operation. In an embodiment, the sensing driver 700 may include an initialization switch 751 providing an initialization voltage VINT to the sensing line SL1, SL2, SL3 to SL[K−1] and SL[K] in response to an initialization signal SINT, a sampling switch 752 connecting the sensing line SL1, SL2, SL3 to SL[K−1] and SL[K] to an analog-to-digital converter ("ADC") 753 in response to a sampling signal SSAM and the analog-to-digital converter 753 generating the sensing data SD based on the sensing current (or the sensing voltage) of the driving transistor received through the sensing line SL1, SL2, SL3 to SL[K−1] and SL[K], but the present invention is not limited thereto. In another embodiment, the sensing driver 700 may be implemented with a separate integrated circuit from an integrated circuit of the data driver 500. In other embodiments, the sensing driver 700 may be included in the data driver 500 or may be included in the driving controller 200.

Figure 2:
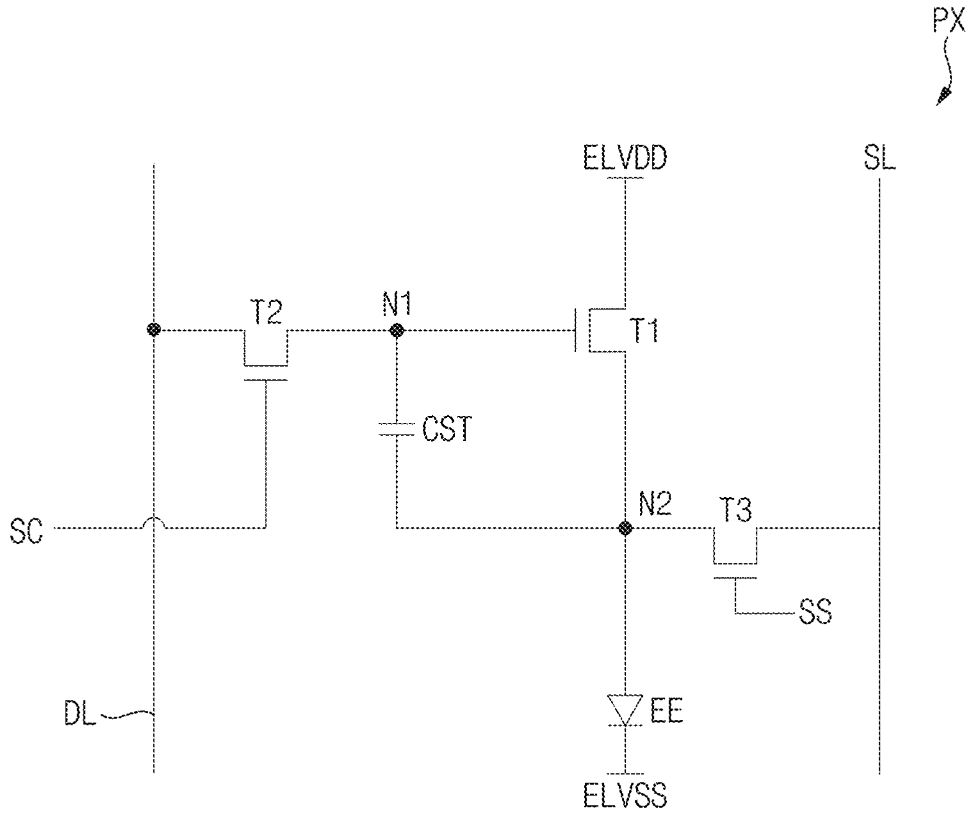
FIG. 2 is a circuit diagram illustrating a pixel included in a display apparatus of FIG. 1.

FIG. 2 is a circuit diagram illustrating a pixel included in a display apparatus of FIG. 1.

Referring to FIG. 2, for example, at least one of the pixels PX may include a first transistor T1, a second transistor T2, a third transistor T3, a storage capacitor CST and a light emitting element EE. In the present embodiment, the first transistor T1 may be the driving transistor.

The storage capacitor CST may store the data voltage received from the data line DL. In an embodiment, the storage capacitor CST may include a first electrode connected to a first node N1 and a second electrode connected to a second node N2.

The second transistor T2 may connect the data line DL to the first node N1 in response to the scan signal SC. The second transistor T2 may output the data voltage of the data line DL to the first node N1 in response to the scan signal SC. In an embodiment, the second transistor T2 may include a control electrode configured to receive the scan signal SC, a first electrode connected to the data line DL and a second electrode connected to the first node N1.

The third transistor T3 may connect the sensing line SL to the second node N2 in response to the sensing gate signal SS. In an embodiment, the third transistor T3 may include a control electrode configured to receive the sensing gate signal SS, a first electrode connected to the sensing line SL and a second electrode connected to the second node N2.

The first transistor T1 may generate a driving current based on the data voltage stored in the storage capacitor CST. In an embodiment, the first transistor T1 may include a control electrode connected to the first node N1, a first electrode configured to receive a first power voltage ELVDD (e.g. high power voltage) and a second electrode connected to the second node N2.

The light emitting element EE may emit the light based on the driving current generated from the first transistor T1. According to embodiments, the light emitting element EE may be an organic light emitting diode (OLED), a quantum dot (QD) or the like, but the present invention is not limited thereto. In another embodiment, the light emitting element EE may include an anode connected to the second node N2 and a cathode configured to receive a second power voltage (e.g. a low power voltage).

Figure 3:
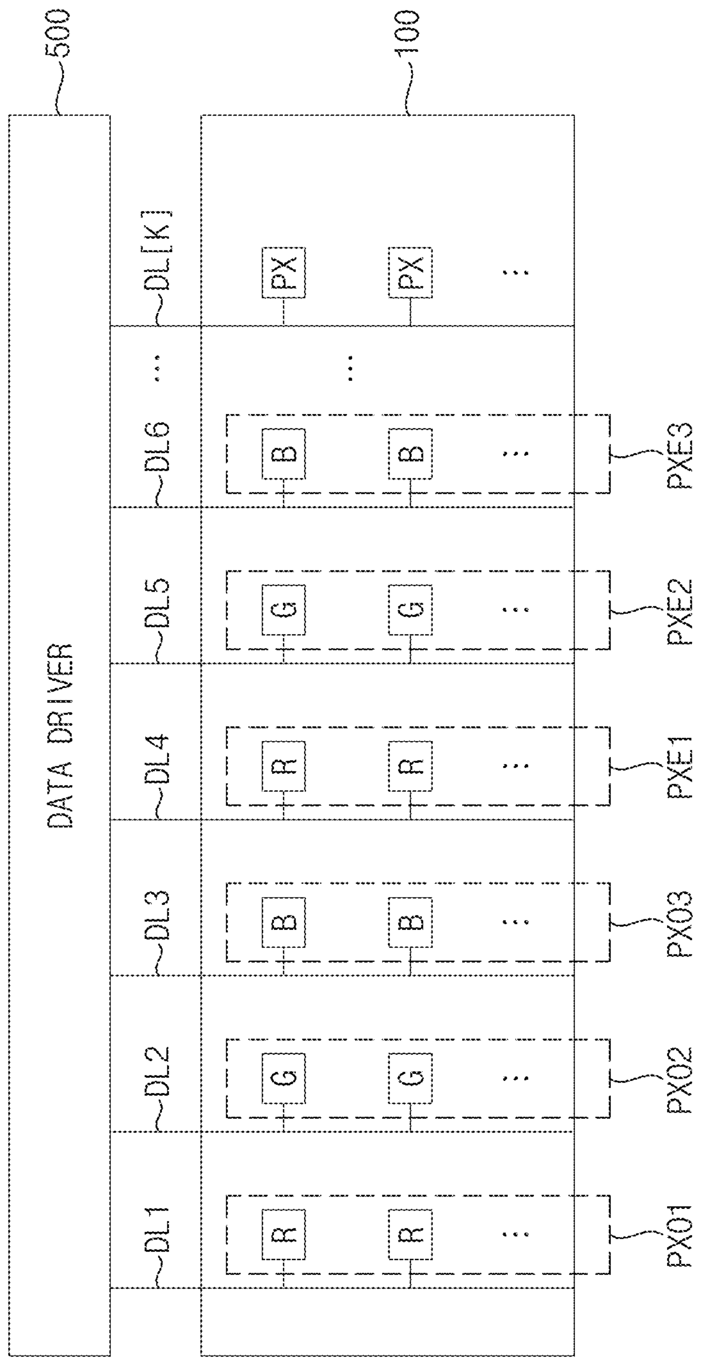
FIG. 3 is a block diagram illustrating a disposition of pixels of display panel included in a display apparatus of FIG. 1 and a data driver of FIG. 1.
Figure 4:
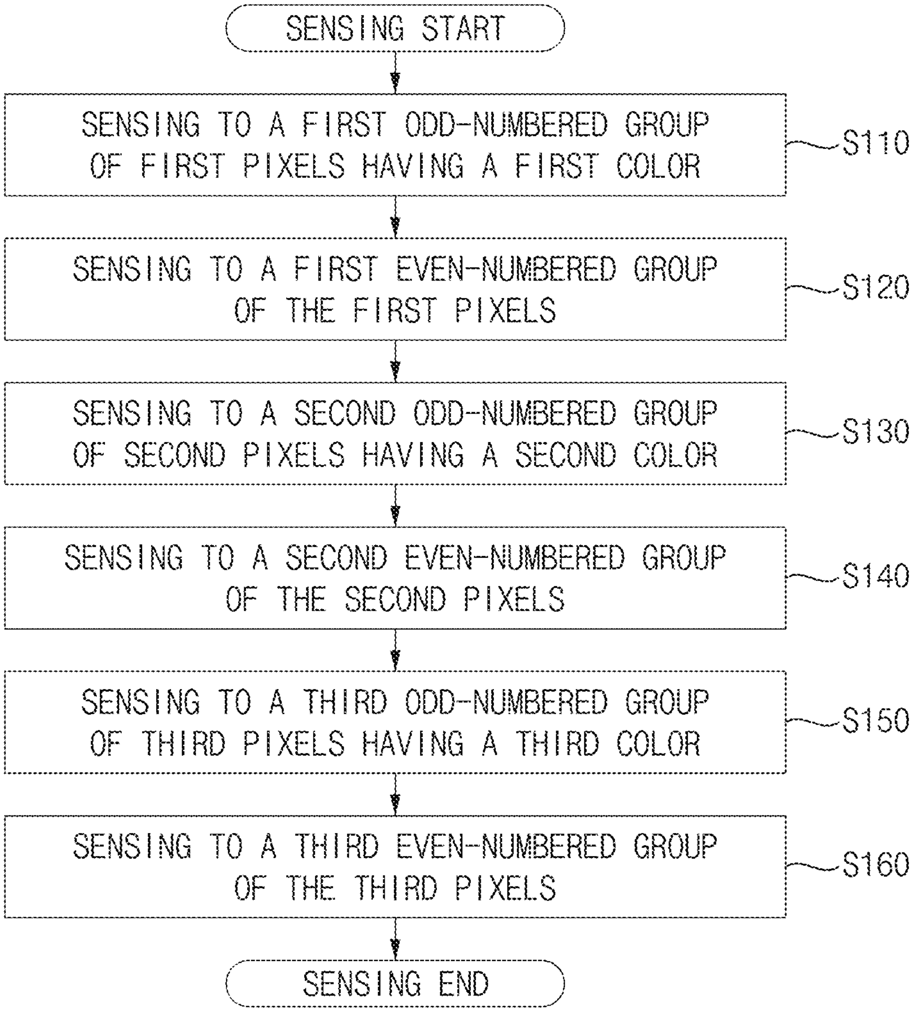
FIG. 4 is a flowchart illustrating a driving method of a display apparatus having a pixel disposition of FIG. 3 in an embodiment.
Figure 5:
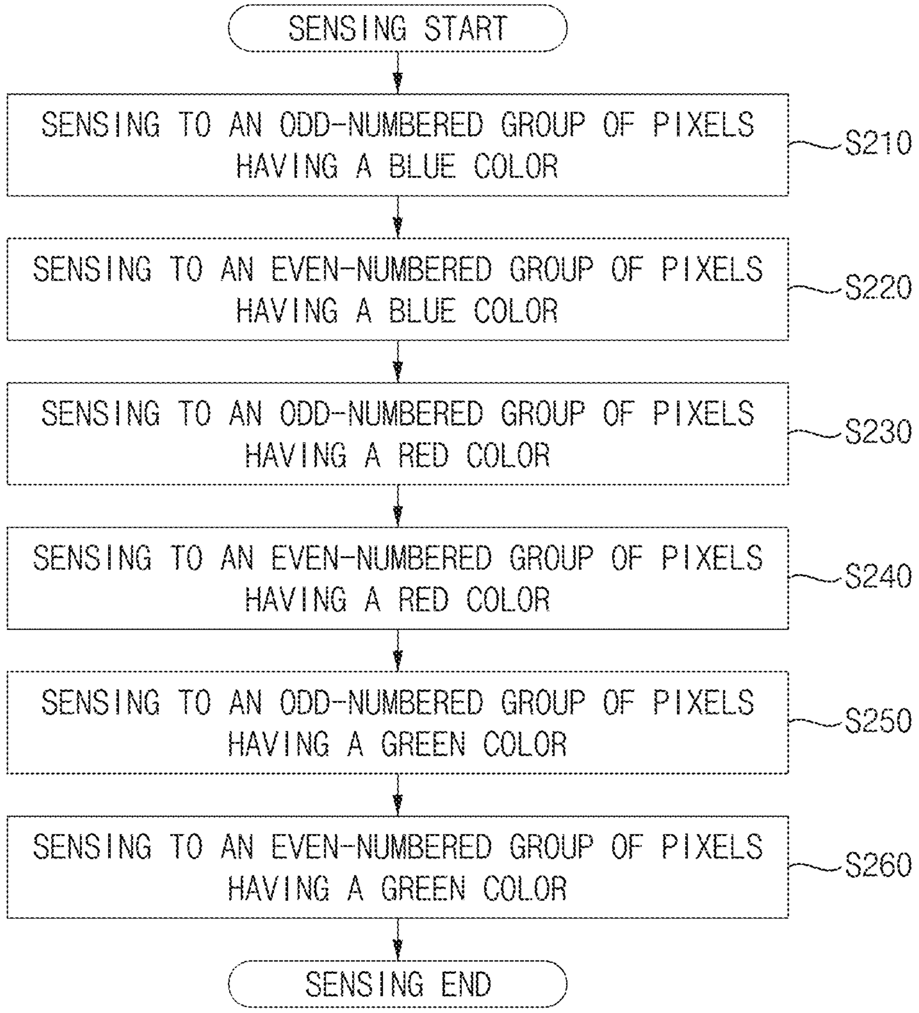
FIG. 5 is a flowchart illustrating a driving method of a display apparatus having a pixel disposition of FIG. 3 in an embodiment.

FIG. 3 is a block diagram illustrating a disposition of pixels of display panel included in a display apparatus of FIG. 1 and a data driver of FIG. 1. FIG. 4 is a flowchart illustrating a driving method of a display apparatus having a pixel disposition of FIG. 3 in an embodiment. FIG. 5 is a flowchart illustrating a driving method of a display apparatus having a pixel disposition of FIG. 3 in an embodiment.

Referring to FIG. 1, FIG. 3 and FIG. 4, the pixels PX may include pixel-columns PX-C. Each pixel-column PX-C may refer to pixels PX commonly connected to one of the data lines DL1, DL2, DL3 to DL[K−1] and DL[K]. The pixels PX may include first pixels, second pixels and third pixels. The first pixels may refer to as pixel-columns PX-C having a first color. The second pixels may refer to as pixel-columns PX-C having a second color different from the first color. The third pixels may refer to as pixel-columns PX-C having a third color different from the first color and the second color. In the present embodiment, the first pixels, the second pixels and the third pixels may be sequentially disposed in the display panel 100 in this order.

In the present embodiment, the first pixels may include a first odd-numbered group PXO1 and a first even-numbered group PXE1. The first odd-numbered group PXO1 may be defined as the pixel-columns PX-C disposed on the odd-numbered order among the first pixels. The first even-numbered group PXE1 may be defined as the pixel-columns PX-C disposed on the even-numbered order among the first pixels. The second pixels may include a second odd-numbered group PXO2 and a second even-numbered group PXE2. The second odd-numbered group PXO2 may be defined as the pixel-columns PX-C disposed on the odd-numbered order among the second pixels. The second even-numbered group PXE2 may be defined as the pixel-columns PX-C disposed on the even-numbered order among the second pixels. The third pixels may include a third odd-numbered group PXO3 and a third even-numbered group PXE3. The third odd-numbered group PXO3 may be defined as the pixel-columns PX-C disposed on the odd-numbered order among the third pixels. The third even-numbered group PXE3 may be defined as the pixel-columns PX-C disposed on the even-numbered order among the third pixels. That is, in the present embodiment, the first odd-numbered group PXO1, the second odd-numbered group PXO2, the third odd-numbered group PXO3, the first even-numbered group PXE1, the second even-numbered group PXE2 and the third even-numbered group PXE3 may be disposed in this order on the display panel 100.

In the present embodiment, the first color may be red, the second color may be green and the third color may be blue.

In the present embodiment, the sensing operation may be performed to the first odd-numbered group PXO1 (S110), may be performed to the first even-numbered group PXE1 (S120) after performed to the first odd-numbered group PXO1 (S110), may be performed to the second odd-numbered group PXO2 (S130) after performed to the first even-numbered group PXE1 (S120), may be performed to the second even-numbered group PXE2 (S140) after performed to the second odd-numbered group PXO2 (S130), may be performed to the third odd-numbered group PXO3 (S150) after performed to the second even-numbered group PXE2 (S140) and may be performed to the third even-numbered group PXE3 (S160) after performed to the third odd-numbered group PXO3 (S150). In contrast, in a conventional display apparatus, the sensing operation may be sequentially performed to the first odd-numbered group PXO1, the second odd-numbered group PXO2, the third odd-numbered group PXO3, the first even-numbered group PXE1, the second even-numbered group PXE2 and the third even-numbered group PXE3.

The panel driver 120 according to the present invention may be different from the conventional display apparatus in the order in which the sensing operation is performed, so that pixels having the same color may be sensed at the substantially same temperature. Accordingly, difference of the sensing data SD according to temperature difference between the pixels having the same color may be decreased. Additionally, the difference of the sensing data SD is decreased, so that difference of a compensation data (e.g. the data voltage considering conditions of the display panel, such as the threshold voltage of the driving transistor, the mobility of the driving transistor, the temperature, etc.) may be decreased. Additionally, the difference of the compensation data is decreased, the quality of display panel 100 may be effectively improved.

In an embodiment, for performing the sensing operation, the panel driver 120 may output a first data voltage to the first data line DL1, then may output a fourth data voltage to the fourth data line DL4, then may output a second data voltage to the second data line DL2, then may output a fifth data voltage to the fifth data line DL5, then may output a third data voltage to the third data line DL3, and then may output a sixth data voltage to the sixth data line DL6.

Referring to FIG. 3 and FIG. 5, in an embodiment, the panel driver 120 may output the third data voltage to the third data line DL3, then may output the sixth data voltage to the sixth data line DL6, then may output the first data voltage to the first data line DL1, then may output the fourth data voltage to the fourth data line DL4, then may output the second data voltage to the second data line DL2, and then may output the fifth data voltage to the fifth data line DL5. Accordingly, the sensing operation performs to an odd-numbered group of blue pixels (S210), the sensing operation performs to an even-numbered group of the blue pixels (S220), the sensing operation performs to an odd-numbered group of red pixels (S230), the sensing operation performs to an even-numbered group of the red pixels (S240), the sensing operation, performs to an odd-numbered group of green pixels (S250) and the sensing operation performs to an even-numbered group of the green pixels (S260) in this order.

Generally, green pixels of pixels may be significantly deteriorated by temperature. Additionally, blue pixels of the pixels may be slightly deteriorated. The panel driver 120 according to the present embodiment may first perform the sensing operation to blue pixels which are less affected by temperature, and then perform the sensing operation to green pixels which are more affected by the temperature. Accordingly, the difference of the compensation data may be more decreased and a precision of the sensing data SD may be effectively improved.

Figure 6:
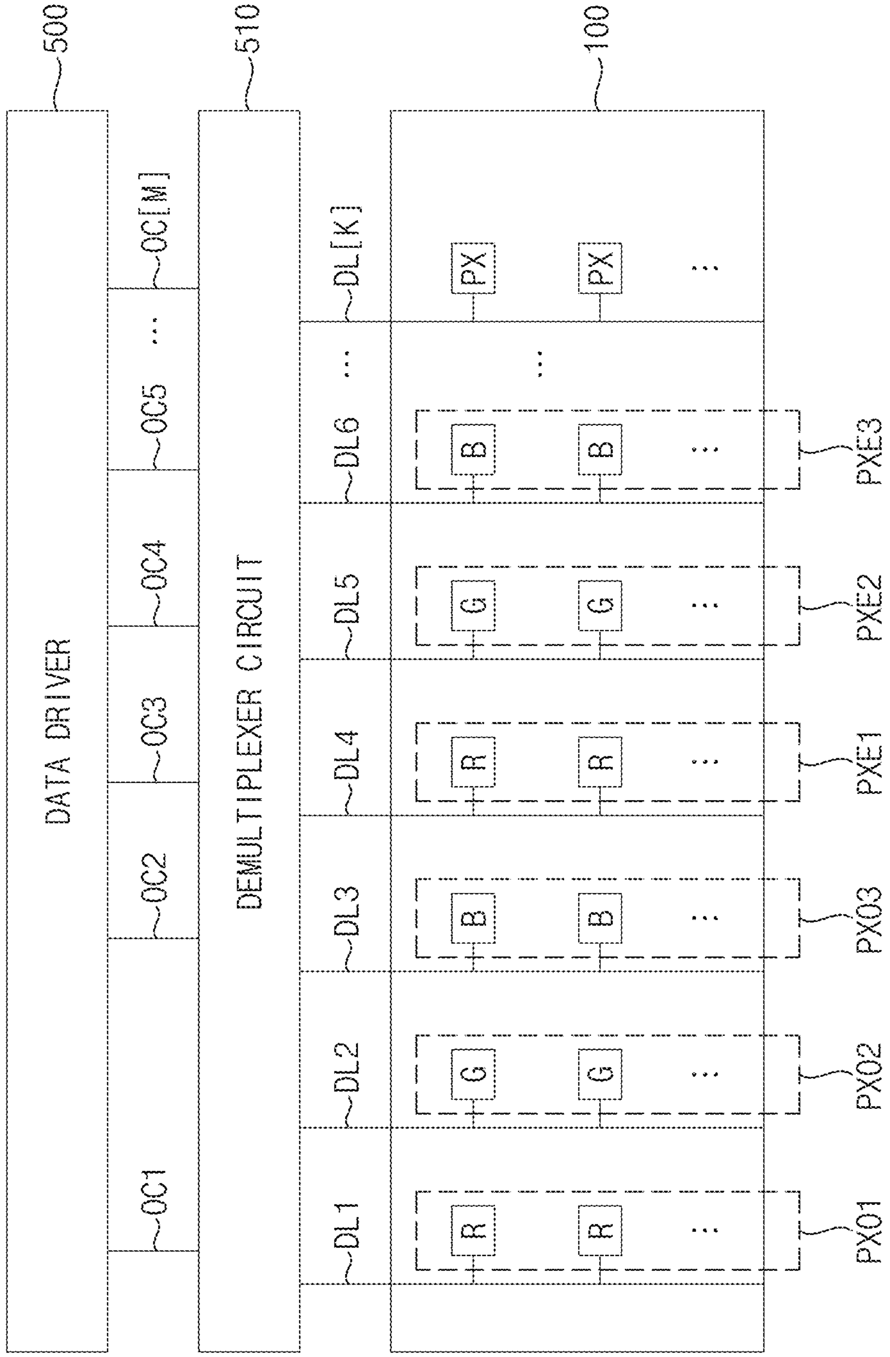
FIG. 6 is a block diagram illustrating a panel driver of FIG. 3 further including a demultiplexer circuit.

FIG. 6 is a block diagram illustrating a panel driver of FIG. 3 further including a demultiplexer circuit 510.

Referring to FIG. 1 and FIG. 3 to FIG. 6, in an embodiment, the panel driver 120 driving the display panel 100 may further include a demultiplexer circuit 510. The demultiplexer circuit 510 may have output channels OC1, OC2, OC3, OC4, OC5 to OC[M] (herein, the M is a positive integer) smaller in number than the number of the data lines DL1, DL2, DL3, DL4, DL5, DL6 to DL[K] of the display panel 100 and demultiplexer circuit 510 may connect the output channels OC1, OC2, OC3, OC4, OC5 to OC[M] of the panel driver 120 to data lines selected among the plurality of data lines DL1, DL2, DL3, DL4, DL5, DL6 to DL[K]. Although FIG. 6 illustrates an example where the demultiplexer circuit 510 is formed or integrated on the display panel 100, the location of the demultiplexer circuit 510 is not limited to the example of FIG. 6. For example, in other embodiments, the demultiplexer circuit 510 may be disposed on the display panel 100 or may be integrated on the display panel 100. Additionally, the demultiplexer circuit 510 may be included in the data driver 500.

Figure 7:
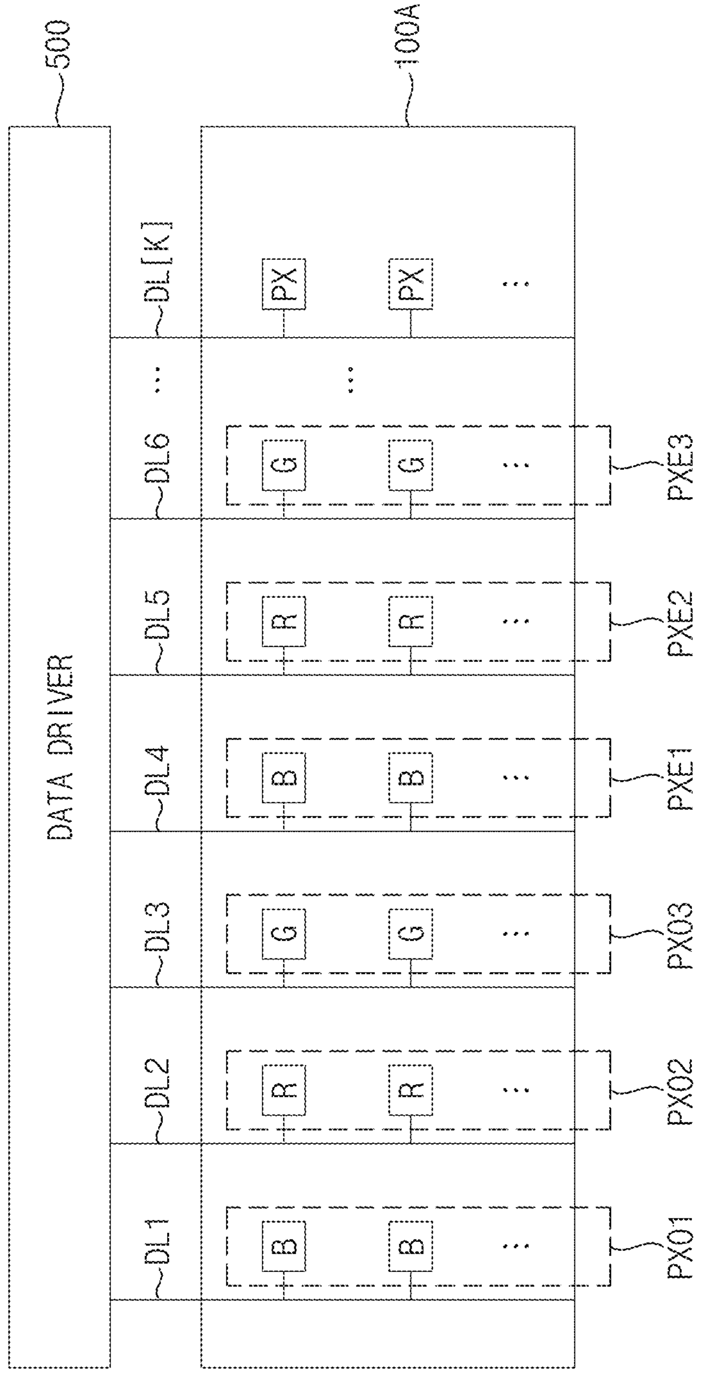
FIG. 7 is a block diagram illustrating a disposition of pixels of display panel included in a display apparatus of FIG. 1 and a data driver of FIG. 1.
Figure 8:
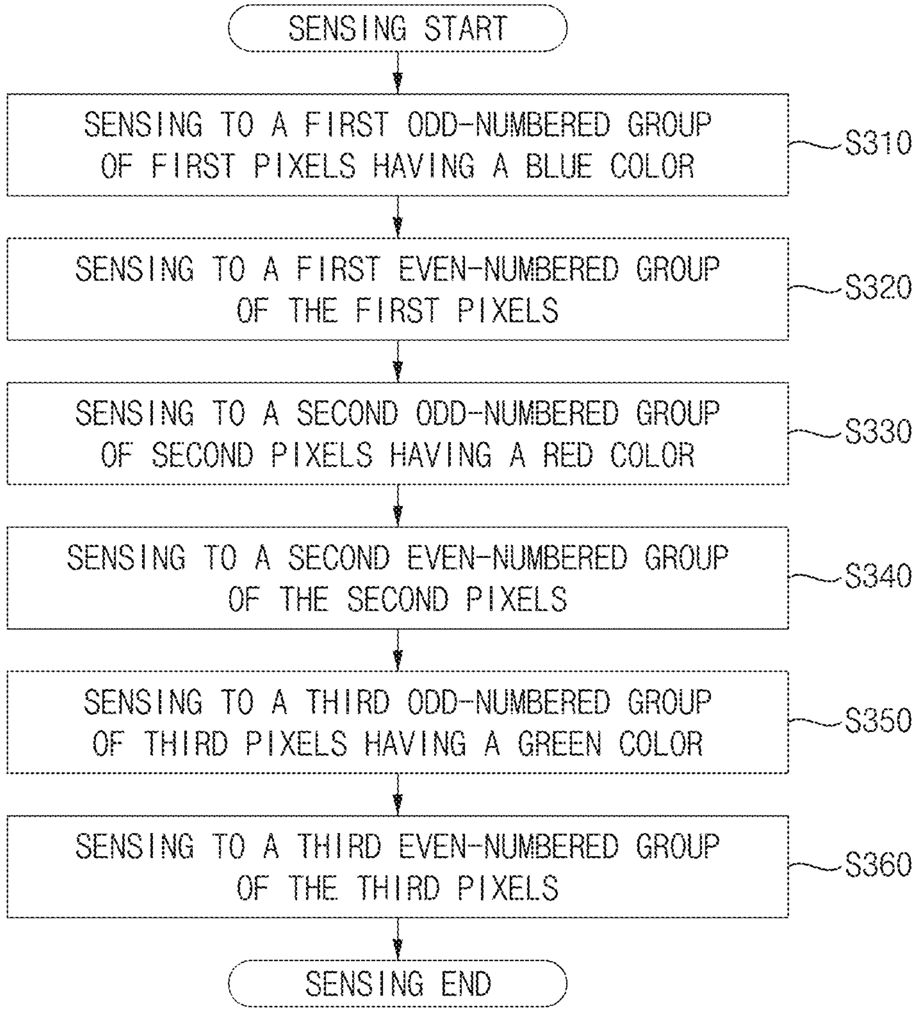
FIG. 8 is a flowchart illustrating a driving method of a display apparatus having a pixel disposition of FIG. 7 in an embodiment.

FIG. 7 is a block diagram illustrating a disposition of pixels of display panel 100A included in a display apparatus of FIG. 1 and a data driver of FIG. 1. FIG. 8 is a flowchart illustrating a driving method of a display apparatus having a pixel disposition of FIG. 7 in an embodiment.

A display panel 100A according to the present embodiment is substantially same as the display panel 100 of FIG. 1 to FIG. 3 except that the first color is blue, the second color is red and the third color is green, so that the same reference numerals will be used to refer to the same and any repetitive explanation concerning the above elements will be omitted.

Referring to FIG. 1, FIG. 7 and FIG. 8, the first color is blue, the second color is red and the third color is green.

In the present embodiment, the sensing operation may be performed to the first odd-numbered group PXO1 (S310), may be performed to the first even-numbered group PXE1 (S320) after performed to the first odd-numbered group PXO1 (S310), may be performed to the second odd-numbered group PXO2 (S330) after performed to the first even-numbered group PXE1 (S320), may be performed to the second even-numbered group PXE2 (S340) after performed to the second odd-numbered group PXO2 (S330), may be performed to the third odd-numbered group PXO3 (S350) after performed to the second even-numbered group PXE2 (S340) and may be performed to the third even-numbered group PXE3 (S360) after performed to the third odd-numbered group PXO3 (S350). In contrast, in a conventional display apparatus, the sensing operation may be sequentially performed to the first odd-numbered group PXO1, the second odd-numbered group PXO2, the third odd-numbered group PXO3, the first even-numbered group PXE1, the second even-numbered group PXE2 and the third even-numbered group PXE3. The panel driver 120 according to the present invention may be different from the conventional display apparatus in the order in which the sensing operation is performed, so that pixels having the same color may be sensed at the substantially same temperature. Accordingly, difference of the sensing data SD according to temperature difference between the pixels having the same color may be decreased. Additionally, the difference of the sensing data SD is decreased, so that difference of a compensation data (e.g. the data voltage considering conditions of the display panel, such as the threshold voltage of the driving transistor, the mobility of the driving transistor, the temperature, etc.) may be decreased. Additionally, the difference of the compensation data is decreased, the quality of display panel 100 may be effectively improved.

Generally, green pixels of pixels may be significantly deteriorated by temperature. Additionally, blue pixels of the pixels may be slightly deteriorated. The display apparatus according to the present embodiment, the first color is blue, the second color is red and the third color is blue. Accordingly, the panel driver 120 may first perform the sensing operation to blue pixels which are less affected by temperature, and then perform the sensing operation to green pixels which are more affected by the temperature. Accordingly, the difference of the compensation data may be more decreased and the precision of the sensing data SD may be effectively improved.

Figure 9:
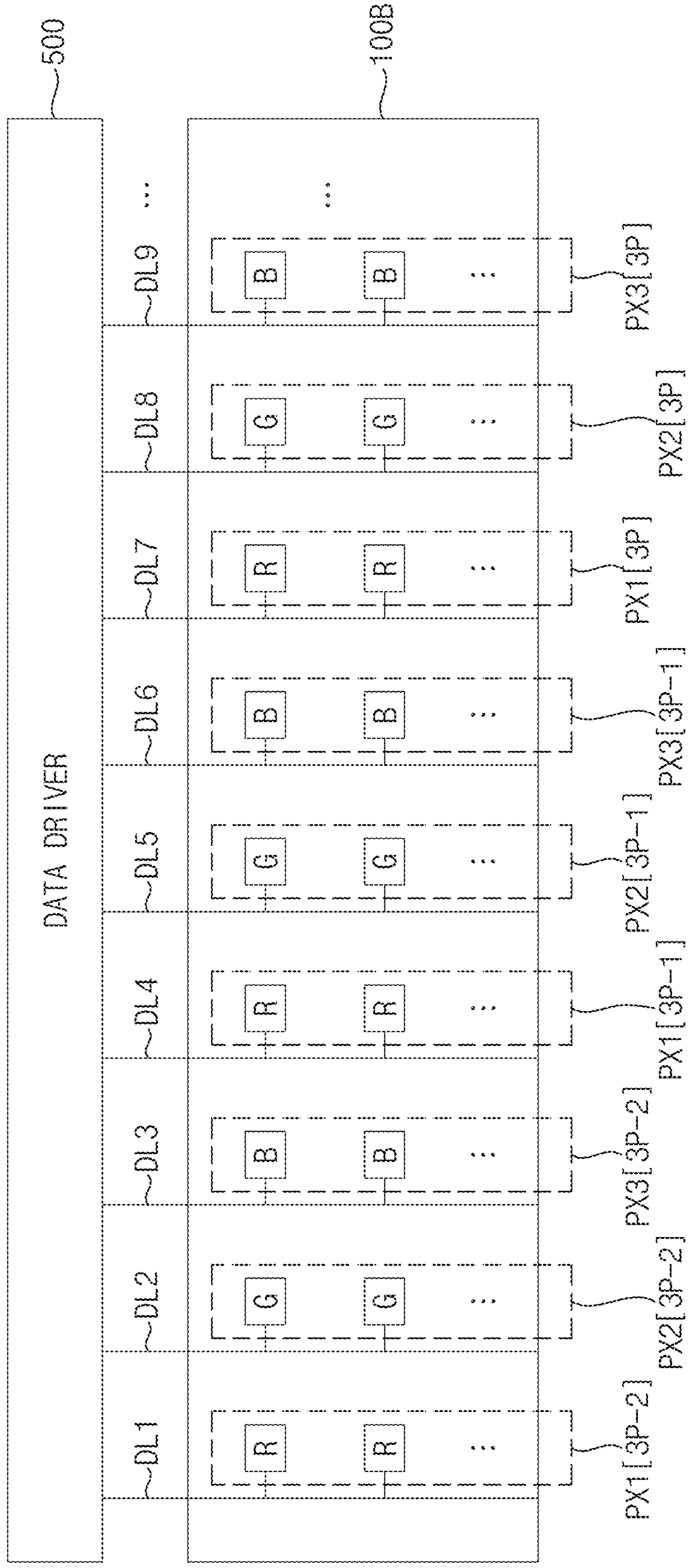
FIG. 9 is a block diagram illustrating a disposition of pixels of display panel included in a display apparatus of FIG. 1 and a data driver of FIG. 1.
Figure 10:
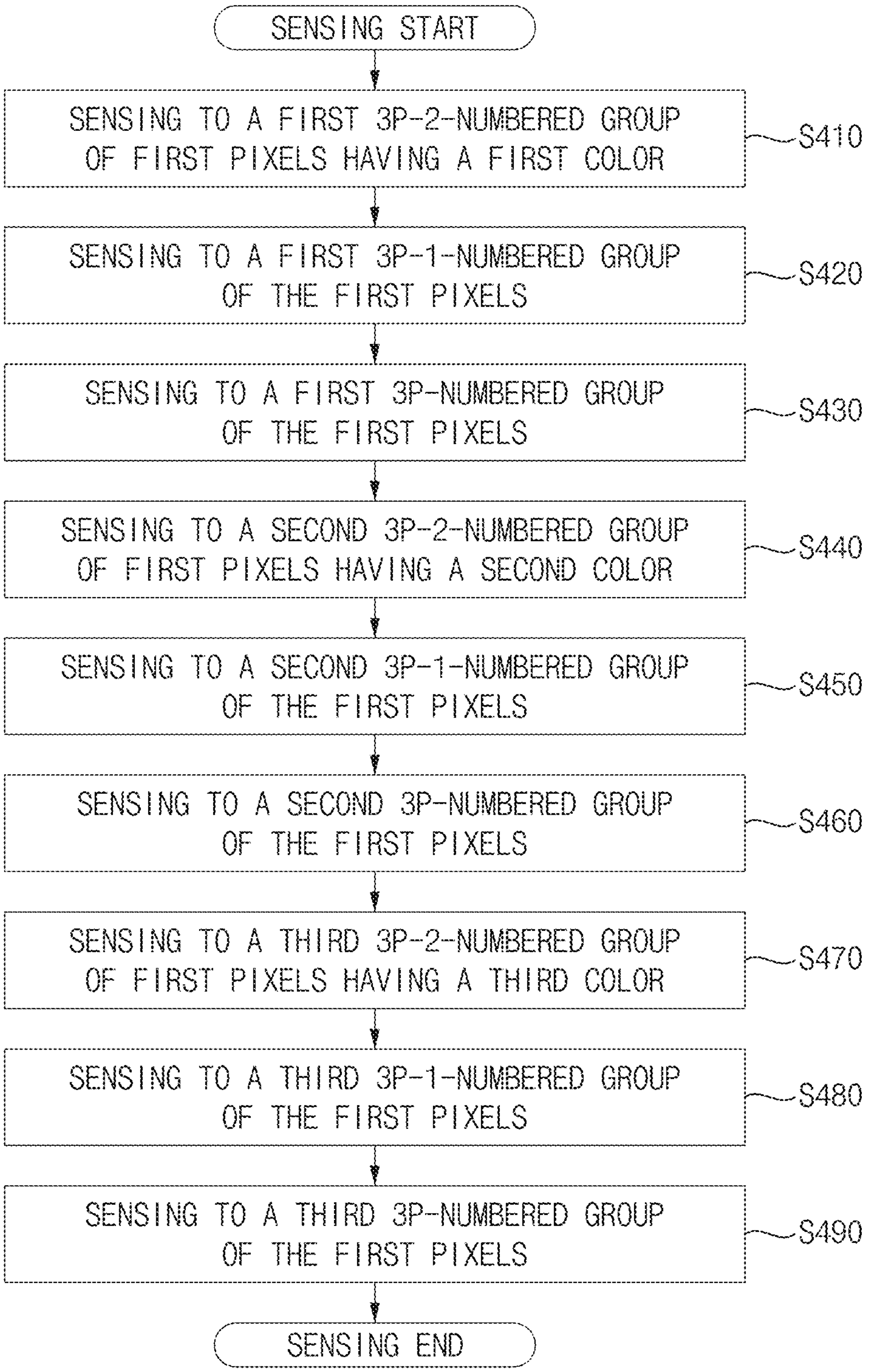
FIG. 10 is a flowchart illustrating a driving method of a display apparatus having a pixel disposition of FIG. 9 in an embodiment.

FIG. 9 is a block diagram illustrating a disposition of pixels PX of display panel 100B included in a display apparatus of FIG. 1 and a data driver of FIG. 1. FIG. 10 is a flowchart illustrating a driving method of a display apparatus having a pixel disposition of FIG. 9 in an embodiment.

Referring to FIG. 1, FIG. 9 and FIG. 10, in the present embodiment, the first pixels may include a first 3P−2-numbered group PX1[3P−2] (herein, the P is a positive integer), a first 3P−1-numbered group PX1[3P−1] and a first 3P-numbered group PX1[3P]. The first 3P−2-numbered group PX1[3P−2] may be defined as the pixel-column PX-C disposed on the 3P−2-numbered order among the first pixels. The first 3P−1-numbered group PX1[3P−1] may be defined as the pixel-column PX-C disposed on the 3P−1-numbered order among the first pixels. The first 3P-numbered group PX1[3P] may be defined as the pixel-column PX-C disposed on the 3P-numbered order among the first pixels.

The second pixels may include a second 3P−2-numbered group PX2[3P−2], a second 3P−1-numbered group PX2[3P−1] and a second 3P-numbered group PX2[3P]. The second 3P−2-numbered group PX2[3P−2] may be defined as the pixel-column PX-C disposed on the 3P−2-numbered order among the second pixels. The second 3P−1-numbered group PX2[3P−1] may be defined as the pixel-column PX-C disposed on the 3P−1-numbered order among the second pixels. The second 3P-numbered group PX2[3P] may be defined as the pixel-column PX-C disposed on the 3P-numbered order among the second pixels.

The third pixels may include a third 3P−2-numbered group PX3[3P−2], a third 3P−1-numbered group PX3[3P−1] and a third 3P-numbered group PX3[3P]. The third 3P−2-numbered group PX3[3P−2] may be defined as the pixel-column PX-C disposed on the 3P−2-numbered order among the third pixels. The third 3P−1-numbered group PX3[3P−1]

may be defined as the pixel-column PX-C disposed on the 3P−1-numbered order among the third pixels. The third 3P-numbered group PX3[3P] may be defined as the pixel-column PX-C disposed on the 3P-numbered order among the third pixels.

That is, in the present embodiment, the first 3P−2-numbered group PX1[3P−2], the first 3P−1-numbered group PX1[3P−1], the first 3P-numbered group PX1[3P], the second 3P−2-numbered group PX2[3P−2], the second 3P−1-numbered group PX2[3P−1], the second 3P-numbered group PX2[3P], the third 3P−2-numbered group PX3[3P−2], the third 3P−1-numbered group PX3[3P−1] and the third 3P-numbered group PX3[3P] may be sequentially disposed on a display panel 100B in this order.

In an embodiment, the first 3P−2-numbered group PX1[3P−2] may be connected to the first data line DL1, the second 3P−2-numbered group PX2[3P−2] may be connected to the second data line DL2, the third 3P−2-numbered group PX3[3P−2] may be connected to the third data line DL3, the first 3P−1-numbered group PX1[3P−1] may be connected to the fourth data line DL4, the second 3P−1-numbered group PX2[3P−1] may be connected to the fifth data line DL5, the third 3P−1-numbered group PX3[3P−1] is connected to the sixth data line DL6, the first 3P-numbered group PX1[3P] is connected to the seventh data line DL7, the second 3P-numbered group PX2[3P] may be connected to the eighth data line DL8 and the third 3P-numbered group PX3[3P] may be connected to the ninth line DL9.

In the present embodiment, the sensing operation may be performed to the first 3P−2-numbered group PX1[3P−2] of the first pixels (S410), may be performed to the first 3P−1-numbered group PX1[3P−1] of the first pixels (S420) after performed to the first 3P−2-numbered group PX1[3P−2] of the first pixels (S410), may be performed to the first 3P-numbered group PX1[3P−1] of the first pixels (S430) after performed to the first 3P−1-numbered group PX1[3P−1] of the first pixels (S420), may be performed to the second 3P−2-numbered group PX2[3P−2] of the second pixels (S440) after performed to the first 3P-numbered group PX1[3P] of the first pixels (S430), may be performed to the second 3P−1-numbered group PX2[3P−1] of the second pixels (S450) after performed to the second 3P−2-numbered group PX2[3P−2] of the second pixels (S440), may be performed to the second 3P-numbered group PX2[3P] of the second pixels (S460) after performed to the second 3P−1-numbered group PX2[3P−1] of the second pixels (S450), may be performed to the third 3P−2-numbered group PX3[3P−2] of the third pixels (S470) after performed to the second 3P-numbered group PX2[3P] of the second pixels (S460), may be performed to the third 3P−1-numbered group PX3[3P−1] of the third pixels (S480) after performed to the third 3P−2-numbered group PX3[3P−2] of the third pixels (S470) and may be performed to the third 3P-numbered group PX3[3P] of the third pixels (S490) after performed to the third 3P−1-numbered group PX3[3P−1] of the third pixels (S480).

In an embodiment, for performing the sensing operation, the panel driver 120 may output the fourth data voltage to the fourth data line DL4 after outputting the first data voltage to the first data line DL1, may output the seventh data voltage to the seventh data line DL7 after outputting the fourth data voltage to the fourth data line DL4, may output the second data voltage to the second data line DL2 after outputting the seventh data voltage to the seventh data line DL7, may output the fifth data voltage to the fifth data line DL5 after outputting the second data voltage to the second data line DL2, may output the eighth data voltage to the eighth data line DL8 after outputting the fifth data voltage to the fifth data line DL5, may output the third data voltage to the third data line DL3 after outputting the eighth data voltage to the eighth data line DL8, may output the sixth data voltage to the sixth data line DL6 after outputting the third data voltage to the third data line DL3 and may output the ninth data voltage to the ninth data line DL9 after outputting the sixth data voltage to the sixth data line DL6.

The panel driver 120 according to the present invention may be different from the conventional display apparatus in the order in which the sensing operation is performed, so that pixels having the same color may be sensed at the substantially same temperature. Accordingly, difference of the sensing data SD according to temperature difference between the pixels having the same color may be decreased. Additionally, the difference of the sensing data SD is decreased, so that difference of a compensation data (e.g. the data voltage considering conditions of the display panel, such as the threshold voltage of the driving transistor, the mobility of the driving transistor, the temperature, etc.) may be decreased. Additionally, the difference of the compensation data is decreased, the quality of display panel 100B may be effectively improved.

In an embodiment, for performing the sensing operation, the panel driver 120 may output the sixth data voltage to the sixth data line DL6 after outputting the third data voltage to the third data line DL3, may output the ninth data voltage to the ninth data line DL9 after outputting the sixth data voltage to the sixth data line DL6, may output the first data voltage to the first data line DL1 after outputting the ninth data voltage to the ninth data line DL9, may output the fourth data voltage to the fourth data line DL4 after outputting the first data voltage to the first data line DL1, may output the seventh data voltage to the seventh data line DL7 after outputting the fourth data voltage to the fourth data line DL4, may output the second data voltage to the second data line DL2 after outputting the seventh data voltage to the seventh data line DL7, may output the fifth data voltage to the fifth data line DL5 after outputting the second data voltage to the second data line DL2 and may output the eighth data voltage to the eighth data line DL8 after outputting the fifth data voltage to the fifth data line DL5.

Generally, green pixels of pixels may be significantly deteriorated by temperature. Additionally, blue pixels of the pixels may be slightly deteriorated. The display apparatus according to the present embodiment, the first color is blue, the second color is red and the third color is blue. Accordingly, the panel driver 120 may first perform the sensing operation to blue pixels which are less affected by temperature, and then perform the sensing operation to green pixels which are more affected by the temperature. Accordingly, the difference of the compensation data may be more decreased and the precision of the sensing data SD may be effectively improved.

Figure 11:
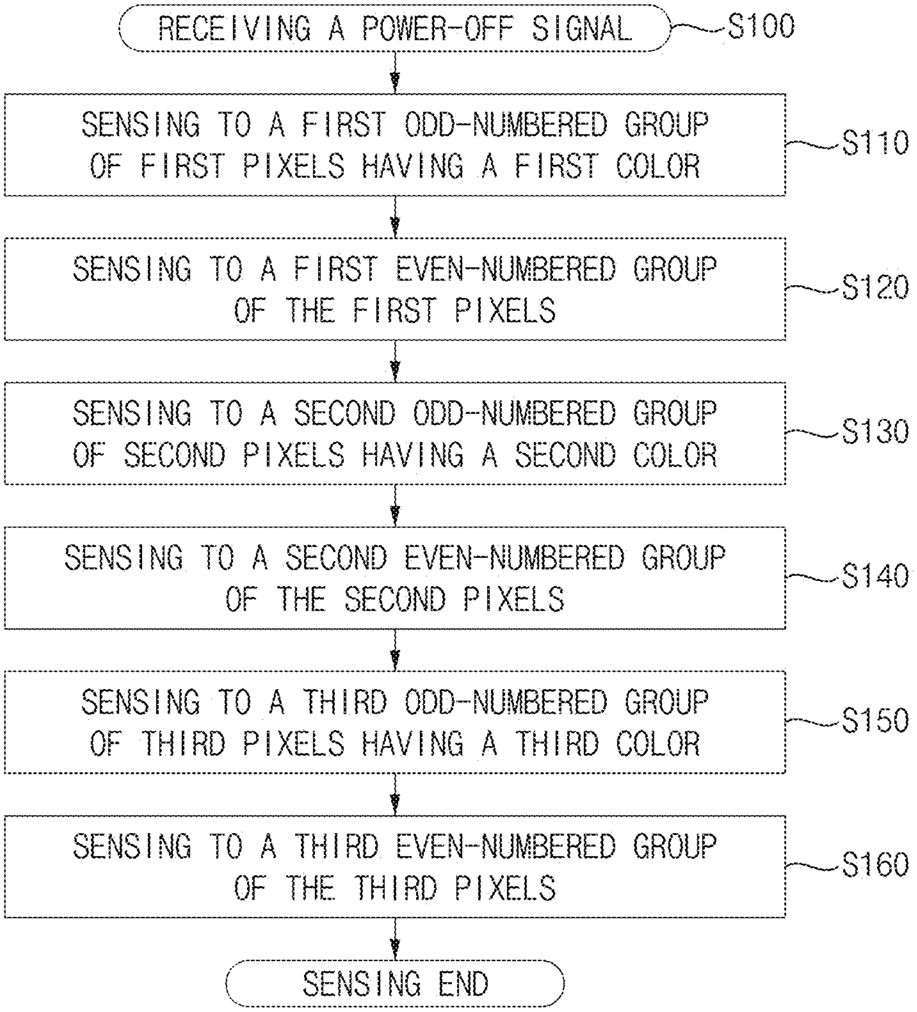
FIG. 11 is a flowchart illustrating a driving method of a display apparatus in embodiments of the present invention.

FIG. 11 is a flowchart illustrating a driving method of a display apparatus in embodiments of the present invention.

A method of driving a display apparatus according to the present embodiment is substantially same as the method of driving the display apparatus of FIG. 4 except that the sensing operation is performed in response to the power-off signal, so that the same reference numerals will be used to refer to the same and any repetitive explanation concerning the above elements will be omitted.

Referring to FIG. 1 and FIG. 11, in the method of driving a display apparatus according to the present embodiment, the sensing operation may be performed in response to the power-off signal POS. Accordingly, the precision of the sensing data SD according to the temperature of the display panel 100 may be improved.

Figure 12:
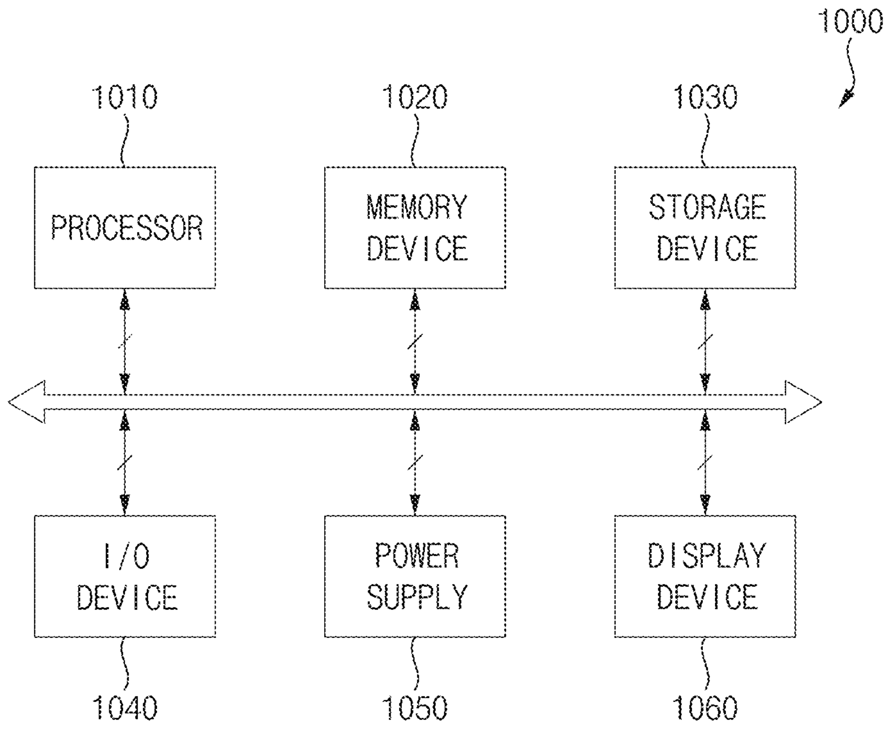
FIG. 12 is a block diagram illustrating an electronic apparatus according to an embodiment of the present invention.

FIG. 12 is a block diagram illustrating an electronic apparatus 1000 according to an embodiment of the present invention Referring to FIG. 12, the electronic apparatus 1000 may include a processor 1010, a memory device 1020, a storage device 1030, an input/output ("I/O") device 1040, a power supply 1050 and a display device 1060. Here, the display device 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

The processor 1010 may perform various computing functions or various tasks. The processor 1010 may be a micro-processor, a central processing unit ("CPU"), an application processor ("AP") and/or the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device and the like and/or at least one volatile memory device such as a dynamic random access memory ("DRAM") device, a static random access memory ("SRAM") device, a mobile DRAM device and the like.

The storage device 1030 may include a solid state drive ("SSD") device, a hard disk drive ("HDD") device, a CD-ROM device and/or the like. The I/O device 1040 may include an input device such as a keyboard, a keypad, a mouse device, a touch-pad, a touch-screen and the like and an output device such as a printer, a speaker and the like. In an embodiment, the display device 1060 may be included in the I/O device 1040. The power supply 1050 may provide power for operations of the electronic apparatus 1000. The display device 1060 may be coupled to other components via the buses or other communication links.

Figure 13:
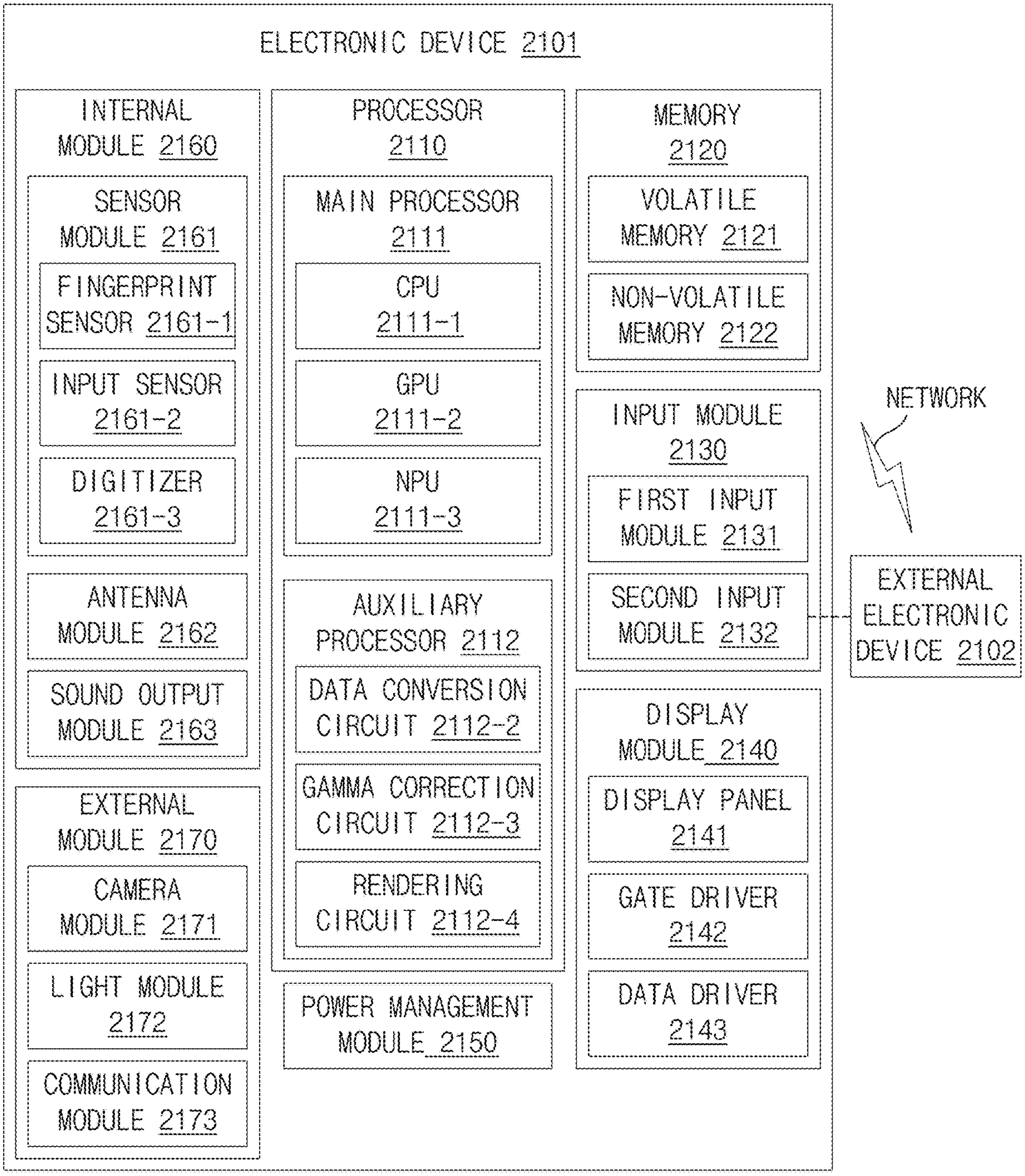
FIG. 13 is a block diagram illustrating an example of an electronic apparatus of FIG. 12.

FIG. 13 is a block diagram illustrating an example of an electronic apparatus of FIG. 12.

An electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component or one component may be provided separately as two or more components.

Referring to FIG. 13, the electronic device 2101 may communicate with an external electronic device 2102 via a network (e.g., a short-range wireless communication network or a long-range wireless communication network). In an embodiment, the electronic device 2101 may include the processor 2110, the memory 2120, the input module 2130, the display module 2140, a power management module 2150, an internal module 2160 and an external module 2170. In an embodiment, at least one of the components may be omitted from the electronic device 2101 or one or more other components may be added in the electronic device 2101. In an embodiment, some of the components (e.g., the sensor module 2161, an antenna module 2162 or the sound output module 2163) may be implemented as a single component (e.g., the display module 2140).

The processor 2110 may execute software to control at least one other component (e.g., a hardware or software component) of the electronic device 2101 coupled with the processor 2110 and may perform various data processing or computation. According to an embodiment, as at least part of the data processing or computation, the processor 2110 may store a command or data received from another component (e.g., the input module 2130, the sensor module 2161 or a communication module 2173) in volatile memory 2121, may process the command or the data stored in the volatile memory 2121 and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor ("CP") and an image signal processor ("ISP"). The main processor 2111 may further include a neural processing unit ("NPU") 2111-3. The NPU 2111-3 may be a processor specialized in processing an artificial intelligence model and the artificial intelligence model may be generated through machine learning. The artificial intelligence model may include a plurality of artificial neural network layers. The artificial neural network may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip) or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140 and may output image data. The controller may output various control signals for driving the display module 2140.

The auxiliary processor 2112 may further include a data conversion circuit 2112-2, a gamma correction circuit 2112-3, a rendering circuit 2112-4 or the like. The data conversion circuit 2112-2 may receive image data from the controller. The data conversion circuit 2112-2 may compensate for the image data such that an image is displayed with a desired luminance according to characteristics of the electronic device 2101 or the user's setting or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161 or the sound output module 2163) of the electronic device 2101 from the outside of the electronic device 2101 (e.g., the user or the external electronic device 2102).

The input module 2130 may include a first input module 2131 for receiving a command or data from the user and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In an embodiment, the second input module 2132 may include a high definition multimedia interface ("HDMI"), a universal serial bus ("USB") interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a gate driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel or a flexible type display panel capable of being rolled or folded. The display module 2140 may further include a supporter, a bracket or a heat dissipation member that supports the display panel 2141.

The gate driver 2142 may be mounted on the display panel 2141 as a driving chip. Alternatively, the gate driver 2142 may be integrated into the display panel 2141. For example, the gate driver 2142 may include an amorphous silicon TFT gate driver circuit ("ASG"), a low temperature polycrystalline silicon ("LTPS") TFT gate driver circuit or an oxide semiconductor TFT gate driver circuit ("OSG") embedded in the display panel 2141. The gate driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the gate driver 2142 or may be integrated into the gate driver 2142.

The data driver 2143 may receive a control signal from the controller, may convert image data into analog voltages (e.g., data voltages) in response to the control signal and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable or a fuel cell. The power management module 2150 may include a power management integrated circuit ("PMIC"). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131 and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen or may transmit/receive data to/from the active pen.

The input sensor 2161-2 may measure a bio-signal, such as blood pressure, moisture or body fat. For example, when a portion of the body of the user touches a sensor layer or a sensing panel and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen or may transmit/receive data to/from the active pen.

At least one of the fingerprint sensor 2161-1, the input sensor 2161-2 and the digitizer 2161-3 may be implemented as a sensor layer disposed on the display panel 2141 through a continuous process. The fingerprint sensor 2161-1, the input sensor 2161-2 and the digitizer 2161-3 may be disposed above the display panel 2141 or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In an embodiment, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor or an illuminance sensor.

The antenna module 2162 may include one or more antennas for transmitting or receiving a signal or power to or from the outside. In an embodiment, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In an embodiment, the receiver may be implemented as separate from or as part of the speaker. A sound output pattern of the sound output module 2163 may be integrated into the display module 2140.

The camera module 2171 may capture a still image and a moving image. In an embodiment, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171 or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system ("GNSS") communication module) or a wired communication module (e.g., a local area network ("LAN") communication module or a power line communication ("PLC") module). The communication module 2173 may communicate with the external electronic device 2102 via a short-range communication network (e.g., Bluetooth™, wireless-fidelity ("Wi-Fi") direct or infrared data association ("IrDA")) or a long-range communication network (e.g., a cellular network, the Internet or a computer network (e.g., LAN or wide area network ("WAN")). These various types of communication modules 2173 may be implemented as a single chip or may be implemented as multi-chips separate from each other.

The input module 2130, the sensor module 2161, the camera module 2171 and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen and may output the image data to the display module 2140. Alternatively, the processor 2110 may generate command data corresponding to the input data and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120 and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161 and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), mobile industry processor interface ("MIPI") or ultra-path interconnect ("UPI")). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. For example, the electronic device 2101 may include at least one of a portable communication device (e.g., a smart phone), a computer device, a portable multimedia device, a portable medical device, a camera, a wearable device and a home appliance. However, the electronic device 2101 according to embodiments is not limited to the above-described devices.

According to the display apparatus described above and the method of driving a display apparatus, in the order in which the sensing operation is performed may be different from the conventional display apparatus, so that pixels having the same color may be sensed at the substantially same temperature. Accordingly, difference of the sensing data according to temperature difference between the pixels having the same color may be effectively decreased.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed and that modifications to the disclosed embodiments, as well as other embodiments, are intended to be included within the scope of the appended claims. The present invention is defined by the following claims, with equivalents of the claims to be included therein.

What is claimed is:

1. A display apparatus comprising:

a display panel including a plurality of pixels; and a panel driver configured to apply a data voltage to pixels in a same pixel-column of the plurality of pixels and to perform a sensing operation, which senses the pixels receiving the data voltage, wherein the plurality of pixels include first pixels having a first color and second pixels having a second color different from the first color, wherein after the sensing operation is performed on a first odd-numbered group of the first pixels, the sensing operation is performed on a first even-numbered group of the first pixels, wherein after the sensing operation is performed on the first even-numbered group, the sensing operation is performed on a second odd-numbered group of the second pixels, and wherein after the sensing operation is performed on the second odd-numbered group, the sensing operation is performed on a second even-numbered group of the second pixels, and wherein the panel driver generates a data signal based on the sensing operation.

2. The display apparatus of claim 1, wherein the plurality of pixels further includes third pixels having a third color different from the first color and the second color, wherein after the sensing operation is performed on the second even-numbered group, the sensing operation is performed on a third odd-numbered group of the third pixels, and wherein after the sensing operation is performed on the third odd-numbered group, the sensing operation is performed on a third even-numbered group of the third pixels.

3. The display apparatus of claim 2, wherein the first color is red, the second color is green and the third color is blue.

4. The display apparatus of claim 2, wherein the first color is blue, the second color is red and the third color is green.

5. The display apparatus of claim 2, wherein the display panel includes first to sixth data lines configured to output the data voltage, wherein the data voltage includes first to sixth data voltages, wherein the first odd-numbered group is connected to the first data line, wherein the second odd-numbered group is connected to the second data line, wherein the third odd-numbered group is connected to the third data line, wherein the first even-numbered group is connected to the fourth data line, wherein the second even-numbered group is connected to the fifth data line, wherein the third even-numbered group is connected to the sixth data line, wherein the panel driver is configured to output the fourth data voltage to the fourth data line after outputting the first data voltage to the first data line, wherein the panel driver is configured to output the second data voltage to the second data line after outputting the fourth data voltage to the fourth data line, wherein the panel driver is configured to output the fifth data voltage to the fifth data line after outputting the second data voltage to the second data line, wherein the panel driver is configured to output the third data voltage to the third data line after outputting the fifth data voltage to the fifth data line, and wherein the panel driver is configured to output the sixth data voltage to the sixth data line after outputting the third data voltage to the third data line.

6. The display apparatus of claim 2, wherein the display panel includes first to sixth data lines configured to output the data voltage, wherein the data voltage includes first to sixth data voltages, wherein the first odd-numbered group is connected to the first data line, wherein the second odd-numbered group is connected to the second data line, wherein the third odd-numbered group is connected to the third data line, wherein the first even-numbered group is connected to the fourth data line, wherein the second even-numbered group is connected to the fifth data line, wherein the third even-numbered group is connected to the sixth data line, wherein the panel driver is configured to output the sixth data voltage to the sixth data line after outputting the third data voltage to the third data line, wherein the panel driver is configured to output the first data voltage to the first data line after outputting the sixth data voltage to the sixth data line, wherein the panel driver is configured to output the fourth data voltage to the fourth data line after outputting the first data voltage to the first data line, wherein the panel driver is configured to output the second data voltage to the second data line after outputting the fourth data voltage to the fourth data line, and wherein the panel driver is configured to output the fifth data voltage to the fifth data line after outputting the second data voltage to the second data line.

7. The display apparatus of claim 1, wherein one of the plurality of pixels includes, a first transistor including a control electrode connected to a first node, a first electrode configured to receive a first power voltage and a second electrode connected to a second node;

a second transistor including a control electrode configured to receive a scan signal, a first electrode connected to a data line and a second electrode connected to the first node;

a third transistor including a control electrode configured to receive a sensing gate signal, a first electrode connected to a sensing line and a second electrode connected to the second node;

a storage capacitor including a first electrode connected to the first node and a second electrode connected to the second node; and a light emitting element including a first electrode connected to the second node and a second electrode configured to receive a second power voltage.

8. The display apparatus of claim 1, wherein the sensing operation is performed in response to a power-off signal applied to the panel driver.

9. A display apparatus comprising:

a display panel including a plurality of pixels; and a panel driver configured to apply a data voltage to pixels in a same pixel-column of the plurality of pixels and to perform a sensing operation, which senses the pixels receiving the data voltage, wherein the plurality of pixels include first pixels having a first color, second pixels having a second color different from the first color, and third pixels having a third color different from the first color and the second color, wherein after the sensing operation is performed on a first 3P−2-numbered group of the first pixels, the sensing operation is performed on a first 3P−1-numbered group of the first pixels, wherein P is a positive integer, wherein after the sensing operation is performed on the first 3P−1-numbered group, the sensing operation is performed on a first 3P-numbered group of the first pixels, wherein after the sensing operation is performed on the first 3P-numbered group, the sensing operation is performed on a second 3P−2-numbered group of the second pixels, wherein after the sensing operation is performed on the second 3P−2-numbered group, the sensing operation is performed on a second 3P−1-numbered group of the second pixels, wherein after the sensing operation is performed on the second 3P−1-numbered group, the sensing operation is performed on a second 3P-numbered group of the second pixels, wherein after the sensing operation is performed on the second 3P-numbered group, the sensing operation is performed on a third 3P−2-numbered group of the third pixels, wherein after the sensing operation is performed on the third 3P−2-numbered group, the sensing operation is performed on a third 3P−1-numbered group of the third pixels, and wherein after the sensing operation is performed on the third 3P−1-numbered group, the sensing operation is performed on a third 3P-numbered group of the third pixels, wherein the first color is red, the second color is green and the third color is blue, wherein the display panel includes first to ninth data lines configured to output the data voltage, wherein the data voltage includes first to ninth data voltages, wherein the first 3P−2-numbered group is connected to the first data line, wherein the second 3P−2-numbered group is connected to the second data line, wherein the third 3P−2-numbered group is connected to the third data line, wherein the first 3P−1-numbered group is connected to the fourth data line, wherein the second 3P−1-numbered group is connected to the fifth data line, wherein the third 3P−1-numbered group is connected to the sixth data line, wherein the first 3P-numbered group is connected to the seventh data line, wherein the second 3P-numbered group is connected to the eighth data line, wherein the third 3P-numbered group is connected to the ninth data line, wherein the panel driver is configured to output the sixth data voltage to the sixth data line after outputting the third data voltage to the third data line, wherein the panel driver is configured to output the ninth data voltage to the ninth data line after outputting the sixth data voltage to the sixth data line, wherein the panel driver is configured to output the first data voltage to the first data line after outputting the ninth data voltage to the ninth data line, wherein the panel driver is configured to output the fourth data voltage to the fourth data line after outputting the first data voltage to the first data line, wherein the panel driver is configured to output the seventh data voltage to the seventh data line after outputting the fourth data voltage to the fourth data line, wherein the panel driver is configured to output the second data voltage to the second data line after outputting the seventh data voltage to the seventh data line, wherein the panel driver is configured to output the fifth data voltage to the fifth data line after outputting the second data voltage to the second data line, wherein the panel driver is configured to output the eighth data voltage to the eighth data line after outputting the fifth data voltage to the fifth data line, and wherein the panel driver generates a data signal based on the sensing operation.

10. The display apparatus of claim 9, wherein the first color is red, the second color is green and the third color is blue.

11. The display apparatus of claim 9, wherein the sensing operation is performed in response to a power-off signal applied to the panel driver.

12. The display apparatus of claim 9, wherein one of the plurality of pixels includes, a first transistor including a control electrode connected to a first node, a first electrode configured to receive a first power voltage and a second electrode connected to a second node;

a second transistor including a control electrode configured to receive a scan signal, a first electrode connected to a data line and a second electrode connected to the first node;

a third transistor including a control electrode configured to receive a sensing gate signal, a first electrode connected to a sensing line and a second electrode connected to the second node;

a storage capacitor including a first electrode connected to the first node and a second electrode connected to the second node; and a light emitting element including a first electrode connected to the second node and a second electrode configured to receive a second power voltage.

13. A method of driving a display apparatus, the method comprising:

sensing a first odd-numbered group of first pixels having a first color;

after sensing the first odd-numbered group, sensing a first even-numbered group of the first pixels;

after sensing the first even-numbered group, sensing a second odd-numbered group of second pixels having a second color different from the first color; and after sensing the second odd-numbered group, sensing a second even-numbered group of the second pixels, and generating a data signal based on sensing data.

14. The method of claim 13, further comprising:

after sensing the second even-numbered group, sensing a third odd-numbered group of third pixels having a third color different from the first color and the second color; and after sensing the third odd-numbered group, sensing a third even-numbered group of the third pixels.

15. The method of claim 14, wherein the first color is red, the second color is green and the third color is blue.

16. The method of claim 14, wherein the first color is blue, the second color is red and the third color is green.

17. The method of claim 13, further comprising receiving a power-off signal before sensing the first odd-numbered group.

* * * * *